UNITED STATES PATENT OFFICE.

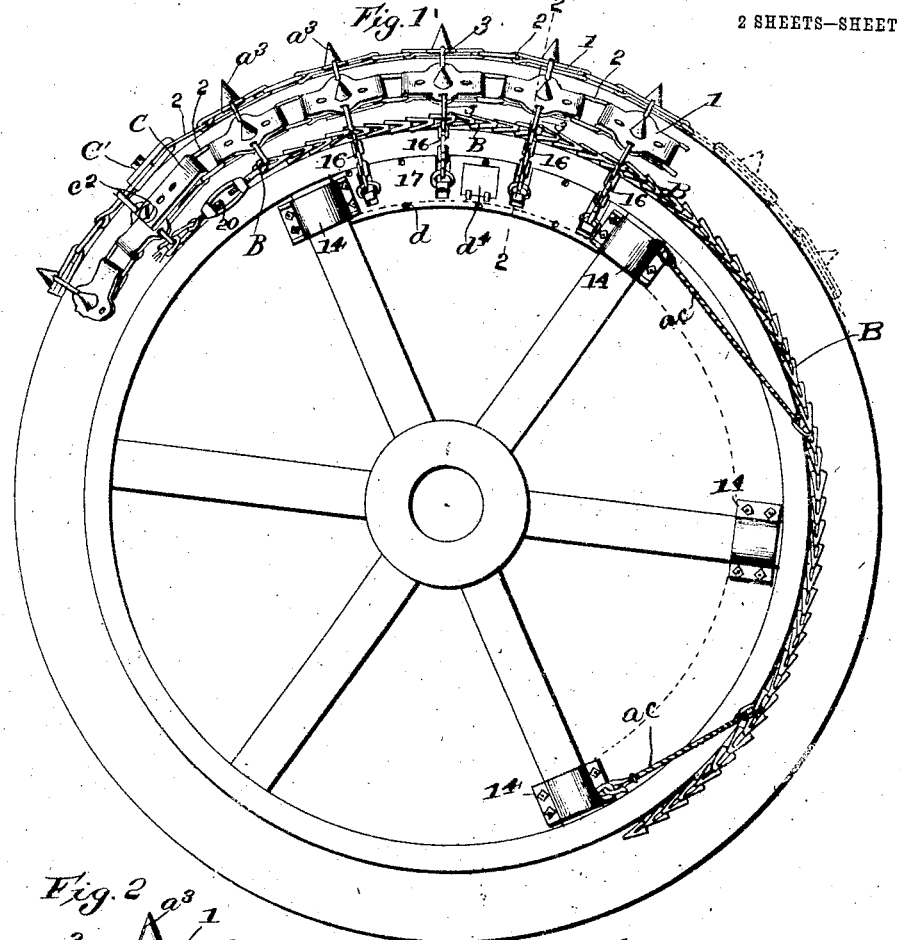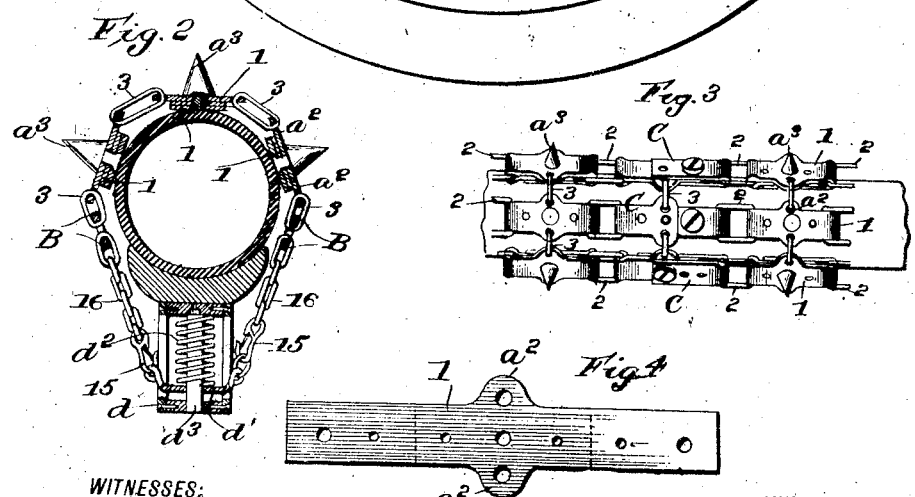

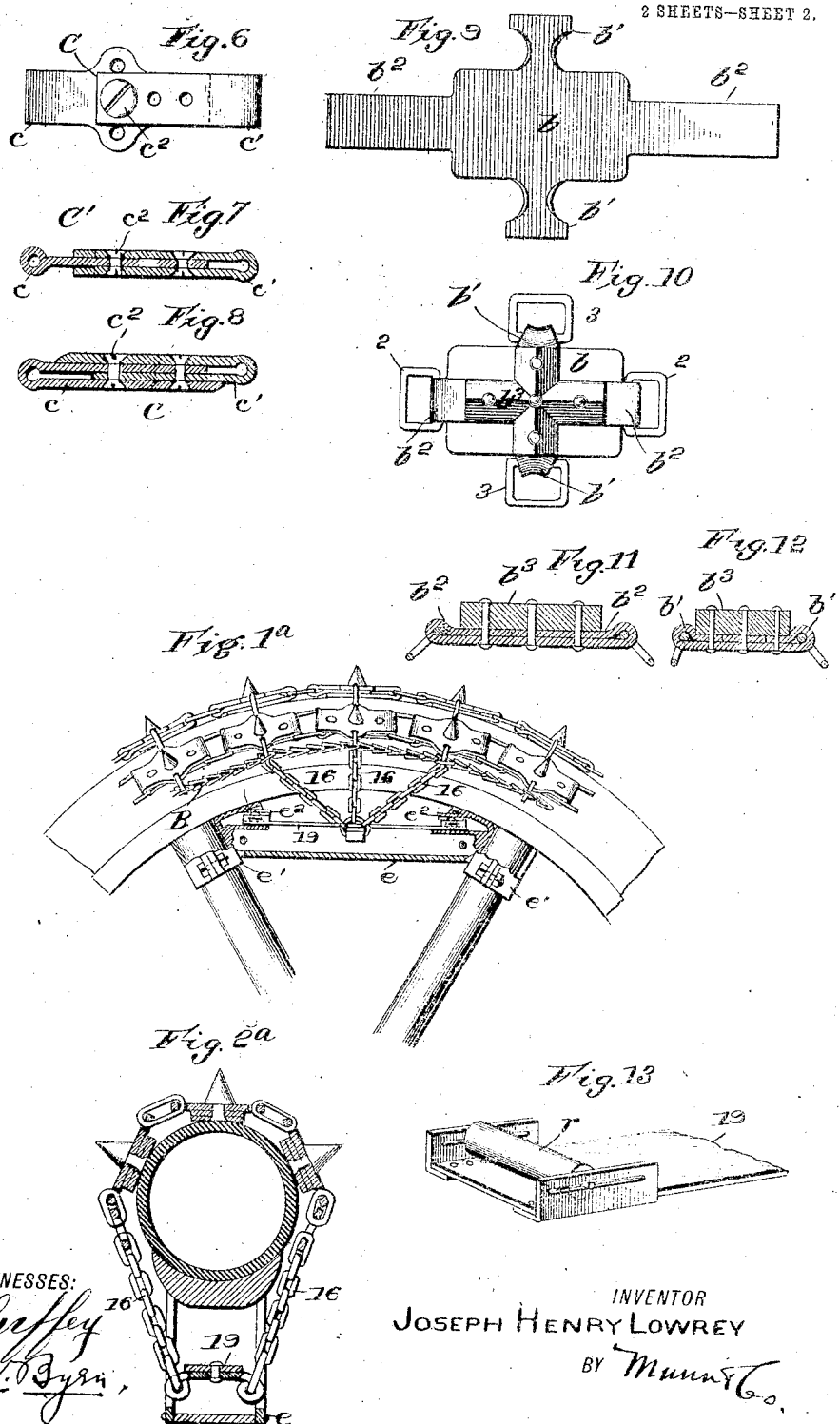

JOSEPH HENRY LOWREY, OF NEOLA, IOWA.

PNEUMATIC-TIRE SHIELD.

No. 833,234.　　　Specification of Letters Patent.　　　Patented Oct. 16, 1906.

Application filed September 26, 1905. Serial No. 280,111.

*To all whom it may concern:*

Be it known that I, JOSEPH HENRY LOWREY, a citizen of the United States, residing at Neola, in the county of Pottawattamie and State of Iowa, have invented a new and useful Improvement in Pneumatic-Tire Shields, of which the following is a specification.

The object of my invention is to provide a simple, strong, and durable shield to be applied to the pneumatic tires of automobiles and other vehicles which shall not only protect the tire against injury, but which shall also increase the tractive adherence to the road, so as to successfully travel over ice, snow, and mud or climb hills without slipping, and which shall also prevent accidents occurring daily by reason of the front wheels failing to respond to the guiding influence of the steering-gear. In such cases, especially in turning curves at high speed, the slipping or skidding of the wheels on the surface of the earth results frequently in the machine bounding into some obstruction or colliding with some other vehicle or plunging into some river or ravine, involving serious loss of life and property.

My invention consists in the novel construction and arrangement of the shield and its various parts, which I will now proceed to describe with reference to the drawings, in which—

Figure 1 is a side elevation of a pneumatic tire and wheel with a portion of my shield applied to the same. Fig. 2 is a cross-section on line 2 2 of Fig. 1. Figs. 1$^a$ and 2$^a$ are similar views of a modification. Fig. 3 is a plan view of a portion of the shield, and Figs. 4 to 13 are details.

The shield consists of a series of plates coupled together by links to form a sort of flexible armor which surrounds all of the outer or exposed part of the pneumatic tire and has on each side a marginal chain ring in connection with a boxing inside the felly containing springs, which are flexibly connected to the edges of the shield to maintain a proper tension of the shield upon the pneumatic tire without affecting its pneumatic quality.

The plates 1 are all made alike of steel cut out of a sheet of the metal and pressed or bent into shape. These plates are cut in the form shown in Fig. 4. Their ends are then bent under until they lap in the middle, forming a loop at each end and a three-ply thickness in the middle. (See Fig. 5.) The loops $a$ are secured by rivets $a'$, which loops serve to connect with links 2, Fig. 1, running longitudinally around the wheel. On opposite sides of the plate in the original stamping are formed perforated wings $a^2 a^2$, which connect with links 3, which run transversely around the tire between the plates, connecting them together laterally. In the center of each plate through its three-ply thickness is riveted a cone-shaped spike $a^3$ or other shape of projection adapted to engage with the road-bed to prevent slipping. The shank of such grappling projection extends entirely through the three layers of the plate, as seen in Fig. 5, which thereby give the connection stiffness and strength, and the inside end of the shank is riveted or upset to a smooth surface where it comes in contact with the tire.

The longitudinal series of plates are connected into continuous rings around the tire by adjustable couplings C C', Fig. 1, each of which (see Figs. 6, 7, and 8) consists of two clevis-shaped plates $c$ and $c'$, whose end loops are caught into the links 2 of the ends of the longitudinal series and which two clevises $c$ $c'$ are adjustably connected by screws $c^2$. These clevis-plates have two series of holes, one series for the set-screws for taking up slack in the direction of their length and the other series arranged transversely to connect the coupling-plates laterally by intermediate links.

B B, Figs. 1 and 2, are the two ring-chains which constitute the two margins of the shield and extend all around the sides of the tire near the line where the tire joins the felly. These ring-chains are coupled on one side by the transverse links 3 into the perforated wings of the adjacent series of plates, to keep the side plates properly spaced apart when under the traction strain. From the outer links 3, or from the chain rings B, there extends radially inward guy-chains 16. These chains are connected to tension devices located just inside the felly, which tension devices pull the edges of the shield inwardly against the tire, taking up slack where the tread of the tire is pressed in by the weight of the machine and yielding outwardly again when the tire expands. These tension devices are contained within a boxing $d$, which lies just inside and against the felly and extends from spoke to spoke all around the wheel. The ends of the boxing are connected by two half-round clamp-plates 14 to the spokes. The construction of these boxed tension devices is best shown in Fig. 2. The inner ends of the guy-chain 16 are connected to the opposite ends of a cross-bar $d'$, which cross-bar is perforated and rides on a spiral spring $d^2$, placed between the cross-bar and the side of the boxing adjoining the felly. Each spring is wound about a stud $d^3$, which passes through the hole in the middle of the cross-bar. These studs extend from the inner to the outer wall of the boxing. The sides of the boxing are slotted where the ends of the cross-bars protrude, and said sides are detachably secured by screws, so that the sides may be removed and the cross-bars taken out if at any time it should be necessary to repair or replace one of the tension-springs, which, it will be seen, may be quickly and conveniently done on the road. One of the sides 17 also has a door $d^4$, by which access is had to the nipple and valve in inflating the tire. At an intermediate point in each guy-chain 16 there is inserted a spring snap-hook 15, (see Fig. 2,) which permits the guy-chains to be quickly loosened for inserting new springs and which also avoids the objection incident to an open link becoming disconnected when the guy-chains are slackened by an inward movement of the shield at the point of contact with the ground. For coupling up the ends of the ring chains B and for tightening the same a turnbuckle 20, Fig. 1, is employed for connecting the ends.

Instead of having the guy-chains 16 connected to separate cross-bars, each provided with its own springs, as in Fig. 1, the guy-chains may be brought together in groups, as seen in Fig. 1$^a$, and be put under the tension of a single spring-bar 19. This spring-bar is disposed as a chord of a circle just inside the felly within a segmental boxing $e$. This boxing is connected by half-sockets $e'$ to the spokes, and these sockets have end cavities $e^2$, in which the ends of the spring-bar 19 ride, said ends of the spring-bar being provided with rollers $r$, (see Fig. 13,) which take up friction in the cavities $e^2$ of the socket-plate.

Instead of forming the tire-plate with conical spikes $A^3$, as seen in Figs. 1 and 2, I may construct them as shown in Figs. 9 to 12. The plate is stamped, as shown at $b$ in Fig. 9. The ends $b^2$ $b^2$ are turned inward to form loops for the links 2, and the side wings $b'$ $b'$ are similarly turned inward to form loops for the links 3. A cruciform projection $b^3$ is then riveted on by the same rivets that secure the loop ends.

I am aware that various attempts have been made to provide a tire-shield formed of chains and links and bearing-blocks, and in pointing out the distinguishing features of my invention I would call attention especially to the particular construction of the shield-plates and to the arrangement of springs for holding the shield against the tire with a yielding action, said springs being located inside the felly, where they are not in contact with the earth and do not become obstructed or rusted out with mud or snow. The independent connection of each transverse series of plates to its own spring secures free and independent action of each set of plates, in which one does not interfere with another, preserving the pneumatic quality of the tire.

To prevent the longitudinal creeping of the tire-shield, and so hold its plates diametrically opposite each series of felly-springs, I provide the small wire cables $a$ $c$. These are attached at their inner ends to a ring or other connection of the socket-plates 14 and at the outer ends to the hoop chain B, the connection of the outer and inner ends being at different radial points around the wheel, so as to remain taut or not be slackened by the elastic inward movement of the tire. These cables may be of any desired number, and one half of them are of a reversed inclination to the other half, so as to resist the traction strain and the creeping of the shield both when going forward and backward. These cables allow the cross-bars to work freely in their radial slots without jamming or binding from the traction strain.

Having thus described my invention, what I claim as new, and desire to secure by Letters Patent, is—

1. A tire-shield, consisting of a flexible armor, springs arranged inside the felly a housing inside the felly for inclosing the springs and means for connecting the springs to the edges of the shield to maintain the same under tension.

2. A tire-shield, consisting of a flexible armor composed of articulated plates and links, a series of springs inside the felly corresponding to the transverse series of plates and means for separately connecting each transverse series of plates to its own spring.

3. A tire-shield, consisting of a flexible armor, springs arranged inside the felly and within the plane of the same and, means connecting the springs to the edges of the shield.

4. A tire-shield, consisting of a flexible armor with road-grappling projections, springs arranged inside the felly and within the plane of the same and chains with snap-hooks connecting said springs to the edges of the armor to maintain the same under tension and hold the road-grappling projections in position.

5. A tire-shield, consisting of a flexible armor, springs arranged inside the felly, a boxing inclosing said springs and means connecting the springs to the edges of the shield.

6. A tire-shield, consisting of a flexible armor, a boxing arranged inside the felly between the spokes, radial studs in said boxing, spiral springs around said studs, cross-pieces on the studs and springs, and means connecting the opposite ends of the cross-pieces to the edges of the shield.

7. A tire-shield, consisting of articulated series of alternating plates and links, the plates being formed with ends bent inwardly into loops to receive a link and having grappling projections riveted through the loop ends.

8. A tire-shield, consisting of articulated series of alternating plates and links, the plates being formed with ends bent inwardly to form loops to connect with links, the infolded ends being lapped to form a three-ply thickness, and a road-grappling projection riveted through the three-ply thickness of the plate.

9. As a new article of manufacture, a plate for a pneumatic-tire shield, consisting of a single piece of sheet metal having perforated side wings and its ends bent inwardly and lapped to form a three-ply thickness in the middle and loops at the ends, and a road-grappling projection riveted through the three-ply thickness of the plate.

JOSEPH HENRY LOWREY.

Witnesses:
THEODORE JAMES GEARHEART,
J. S. HERMSEN.